US007174195B2

(12) United States Patent
Nagamine (10) Patent No.: US 7,174,195 B2
(45) Date of Patent: Feb. 6, 2007

(54) FOLDABLE PORTABLE TELEPHONE HAVING A DISPLAY PORTION SELECTIVELY PUT INTO A LENGTHWISE STATE OR AN OBLONG STATE AND A PAIR OF FRONT CAMERA PORTIONS

(75) Inventor: Yasuo Nagamine, Tokyo (JP)

(73) Assignee: NEC Corporation, Tokyo (JP)

( * ) Notice: Subject to any disclaimer, the term of this patent is extended or adjusted under 35 U.S.C. 154(b) by 496 days.

(21) Appl. No.: 10/422,947

(22) Filed: Apr. 25, 2003

(65) Prior Publication Data
US 2003/0203747 A1 Oct. 30, 2003

(30) Foreign Application Priority Data
Apr. 26, 2002 (JP) ............................ 2002-125370

(51) Int. Cl.
*H04M 1/00* (2006.01)
*H04B 1/38* (2006.01)
(52) U.S. Cl. ................ 455/575.1; 455/575.3; 455/566; 379/433.04; 379/433.13
(58) Field of Classification Search ............. 455/575.1, 455/575.3, 566; 379/433.04, 433.13
See application file for complete search history.

(56) References Cited

U.S. PATENT DOCUMENTS 5,831,765 A  11/1998  Nakayama et al.
6,009,336 A  12/1999  Harris et al.
6,658,272 B1 * 12/2003 Lenchik et al. ............. 345/164
6,850,784 B2 * 2/2005 SanGiovanni ............ 455/575.1
D512,395 S * 12/2005 Kim et al. ................ D14/138
2001/0004269 A1  6/2001  Shibata et al.
2002/0051060 A1  5/2002  Wada

FOREIGN PATENT DOCUMENTS

EP      1 126 709 A1    8/2001

(Continued)

OTHER PUBLICATIONS

Patent Abstracts of Japan, vol. 2000, No. 23, Feb. 10, 2001 (corresponds to JPA 2001-156893, published Jun. 8, 2001).

(Continued)

*Primary Examiner*—Matthew D. Anderson
*Assistant Examiner*—Yuwen Pan
(74) *Attorney, Agent, or Firm*—Sughrue Mion, PLLC (57) ABSTRACT

In a foldable portable telephone set including a lower unit (20) having a console portion (12), an upper unit (30) having a display portion (11), and a hinge portion (13) for joining the lower unit to the upper unit so as to enable to open and close them, the upper unit (30) consists of a display portion unit (32), a supporting portion unit (34), and a rotating and sliding mechanism (40). A pair of front camera portions (17*a*, 17*b*) is disposed on the upper unit so as to position up and down of the display portion when the display portion is put into the lengthwise state and to position right and left of the display portion when the display portion is put into the oblong state by rotating and sliding the display portion unit using the rotating and sliding mechanism.

17 Claims, 9 Drawing Sheets

FOREIGN PATENT DOCUMENTS

| | | |
|---|---|---|
| JP | 9-116882 A | 5/1997 |
| JP | 10-155013 A | 6/1998 |
| JP | 10-221646 A | 8/1998 |
| JP | 10-232366 A | 9/1998 |
| JP | 11-39131 A | 2/1999 |
| JP | 2000-270069 A | 9/2000 |
| JP | 2001-156893 A | 6/2001 |
| WO | WO 01/84269 A2 | 11/2001 |

OTHER PUBLICATIONS

Patent Abstracts of Japan, vol. 1998, No. 8, Jun. 30, 1998 (corresponds to JPA 10-75432, published Mar. 17, 1998).

Patent Abstracts of Japan, vol. 1998, No. 11, Sep. 30, 1998 (corresponds to JPA 10-155013, published Jun. 9, 1998).

Patent Abstracts of Japan, vol. 2000, No. 12, Jan. 3, 2001 (corresponds to JPA 2000-270069, published Sep. 29, 2000).

* cited by examiner

FOLDABLE PORTABLE TELEPHONE HAVING A DISPLAY PORTION SELECTIVELY PUT INTO A LENGTHWISE STATE OR AN OBLONG STATE AND A PAIR OF FRONT CAMERA PORTIONS

This application claims priority of prior application JP 2002-125370, the disclosure of which is incorporated herein by reference.

BACKGROUND OF THE INVENTION

This invention relates to a foldable cellular or portable telephone set and, more particularly, to a foldable cellular or portable telephone set comprising camera portions.

In a manner known in the art, in recent years, portable telephone sets are used in various ways, i.e., as a browser for the Internet or the like, an electric mail transmission and reception terminal, a portable information terminal (personal digital assistance (PDA)) with a schedule management function or the like, a recording/reproducing terminal for voice and picture data and so on, as well as a telephone call tool.

The browser is a software for use to grasp a general image of data group and object group and for use to pick up a desired information. The electronic mail is a system used by the terminals such as personal computers, workstations, and so on for use in exchanging data such as characters (texts), voice, etc. in a form of mail (letters) via a computer network. The personal digital assistance is a generic term which represents terminals each of which have a function of an electronic notebook or a personal computer and which can be carried around.

The portable telephone set of the type described generally comprises a display portion and a console portion such as numeric keypads or the like. The portable telephone set comprising one or more camera portions is also known.

However, a conventional typical portable telephone set having a foldable (collapsible) structure has a disadvantage that it lacks flexibility and troublesome to operate in case where, for example, displaying the images in landscape form.

Various folding portable telephone sets and related technical ideas have been proposed. For example, Japanese Unexamined Patent Publication Tokkai No. 2001-156,893 or JP-A 2001-156893 (prior art document 1) discloses a "display system of a communication apparatus" by which the letters (fonts) are easy to read and easy to input. In the prior art document 1, the display system of the communication apparatus having a liquid crystal display which is long in lengthwise direction is provided with a display unit part for rotating the liquid crystal display part from a vertical position to a horizontal position and vice versa and with a display switching part for switching the display of the liquid crystal part from the vertical mode to the horizontal mode with the rotation of the display unit part or performing reverse switching.

However, the prior art document 1 merely discloses a technical idea for changing the direction of the display screen from the lengthwise to oblong state by rotating the display screen (the display unit). In addition, the prior art document 1 does not disclose how to display on the display screen image information picked up by the camera portion.

In addition, Japanese Unexamined Patent Publication Tokkai No. 2000-270,089 or JP-A 2000-270069 (prior art document 2) discloses a "portable information terminal with a digital camera" which can be carried around with its camera lens and a liquid crystal surface of a display part facing each other so as to prevent the fragile parts from being exposed outside. The portable information terminal with the digital camera disclosed in the prior art document 2 comprises an image pickup part having image pickup means, a display part having display means, and a hinge part having at least one mechanism for allowing the display part to rotate. When a rotary support part of the image pickup part or the display part is rotated around a rotary shaft, the image pickup means (a lens) of the image pickup part and the display means of the display part are housed opposite to each other, i.e., in a folded state without being exposed. Therefore, the lens and liquid surface can be prevented from dust, flaw, breakage, fault, etc.

However, the prior art document 2 merely discloses a technical idea in which the lens of the camera and the liquid crystal surface of the display part are positioned to face each other and does not teaches an idea for rotating the display screen from lengthwise state to the oblong state, and vice versa.

U.S. Patent Application Publication No. US2002/005160 (prior art document 3) discloses a foldable portable terminal unit containing a picture taking camera capable of transmitting an image and voice, monitoring through a display device is enabled in case of taking picture of himself or herself with that picture taking camera as well as taking picture of an outside object. In the foldable portable terminal unit disclosed in the prior art document 3, a lid portion is made foldable with respect to a case main body of the portable terminal unit and rotatable with respect to the case main body. A display device provided in the lid portion is rotated with respect to the picture taking camera fixed on rear face or a side face of the case main body corresponding to the state of taking a picture so as to enable monitoring.

However, the prior art document 3 merely discloses a technical idea which enables to monitor a display screen in cases of taking picture of him/herself by the camera and of taking picture of the object outside. That is, the prior art document 3 never discloses an idea for shifting the display screen from the lengthwise state to the oblong state and merely discloses a case where only one picture taking camera is provided.

In addition, Japanese Unexamined Patent Publication Tokkai No. Hei 9-116,882 or JP-A 9-116882 (prior art document 4) discloses "audio visual communication equipment" capable of executing smooth conversation without interrupting the conversation. In the prior art document 4, technical idea comprising the steps of fixedly arranging the two video camera devices at the right and left of the video monitor device and of synthesizing the pictures of the respective camera devices in the center. That it, an object of the prior art document 4 is to execute smooth conversation without any interruptions. The assumption that picture of himself and herself during conversation is taken with the two video camera devices. A three-dimensional (3-D) image processing is also disclosed in the prior art document 4. However, in the document, the two video camera devices are fixedly arranged at the righthand and lefthand side of the video monitor device. The document 4 never discloses a method of movably arranging the video camera device with respect to the video monitor device.

Furthermore, Japanese Unexamined Patent Publication Tokkai No. Hei 11-39,131 or JP-A 11-39131 (prior art document 5) discloses "mobile information communication terminal equipment" which is capable of automatically determining suitability of a display image to vertically long (lengthwise) or horizontally long (oblong) display device state and of performing suitable image display without any operation of a user. In the prior art document 5, display device orientation information indicative of the direction for use of a display device corresponding to respective plural operation modes is stored in a display device orientation information storage area. Then, the operation mode during execution is determined by operation mode decision means, and image display control means controls so as to display the image to be displayed at a display device as a prescribed image suitable for using the display device in the direction for use made to correspond to the determined operation mode by the display device orientation information.

The prior art document 5 merely discloses an technical idea for automatically determining suitability of the display image either to vertically long or horizontally long display device state without operation of the user. In other words, the document 5 discloses an idea of automatically deciding the suitable direction for displaying the image. It is not an idea for rotating a "display screen" from lengthwise state to the oblong state or vice versa in the manner which is described in the above-mentioned prior art document 1.

Japanese Unexamined Patent Publication Tokkai No. Hei 10-155,013 or JP-A 10-155013 (prior art document 6) discloses "portable communication equipment" that is composed of a case separated in plural parts and a detachable connector for structurally and electrically connecting the separated parts and to which the connector of a kind and a shape adaptable to the application is selected. In the prior art document 6, a portable telephone set main body is separated into an upper case and a lower case. The upper case and the lower case are connected by a connector. The upper case has a front side which is provided with a reception part and a display part. The lower case has a front face which is provided with a key operation part and a transmission part. The upper case and the lower case have a circuit board on which a connector connection part connected to connection parts of connectors. The upper case and the lower case have slits. Inasmuch as a shape and standards of the connection parts are unified, the optional selection can be made of a rotary type connector, a straight line type connector or a bent type connector for the connection.

The prior art document 6 merely discloses a technical idea for freely changing the portable communication equipment between a unified type and a foldable type by changing the connectors. That is, the prior art document 6 never discloses an idea for freely changing a "display screen" between a lengthwise state and an oblong state.

SUMMARY OF THE INVENTION

It is therefore an object of this invention to provide a foldable portable telephone set which is capable of converting an image in both a lengthwise state and a oblong state as well as capable of changing the direction of a display screen in both the lengthwise and the oblong state and carrying out various ways of image processing.

Other objects of this invention will become clear as the description proceeds.

On describing the gist of an aspect of this invention, it can be understood that a foldable portable telephone set comprises a lower unit having a console portion, an upper unit having a display portion, and a hinge portion for joining the lower unit to the upper unit so as to enable the opening and closing operation. The display portion can be shifted with respect to the lower unit between a lengthwise state and an oblong state. The foldable portable telephone further comprises a pair of front camera portions disposed on the upper unit so as to position up and down of the display portion when the display portion is put into the lengthwise state and to position right and left of the display portion when the display portion is put into the oblong state.

According to a first aspect of this invention, in the above-understood foldable portable telephone set, the upper unit comprises a display portion unit, a supporting portion unit, and a rotating mechanism for electrically and structurally connecting the display portion unit and the supporting portion unit and for rotating the display portion unit with respect to the supporting portion unit. In this event, the display portion is put into the oblong state by rotating the display portion unit by about 90 degrees using the rotating mechanism in a case where the display portion is put into the lengthwise state. In lieu of the rotating mechanism, the upper unit may comprise a rotating and sliding mechanism for electrically and structurally connecting the display portion unit and the supporting portion unit and for rotating and sliding the display portion unit with respect to the supporting portion unit. In this event, the display portion is put into the oblong state by rotating the display portion unit by about 90 degrees and by sliding the display portion using the rotating and sliding mechanism in a case where the display portion is put into the lengthwise state.

The foldable portable telephone set according to the first aspect of this invention preferably may comprise detecting means for detecting whether the display portion is put into the lengthwise state or the oblong state to produce a detected signal and display converting means for converting display contents so at to fit to a direction of a display screen according to the detected signal and for displaying converted display contents on the display portion. The detecting means may comprise a magnet disposed in the display portion unit and a plurality of magnetic sensors disposed in the supporting portion unit.

According to a second aspect of this invention, in the above-understood foldable portable telephone set, the hinge portion is a hinge-type connector for detachably connecting the upper unit. The hinge-type connector has a connector connection portion for connecting to the upper unit. The upper unit has a plurality of unit connection portions for connecting to the connector connection portion at a lower side and lateral sides thereof. By changing the unit connection portions to be connected to the connector connection portion, it is possible to switch the display portion between the lengthwise state and the oblong state.

In the above-mentioned foldable portable telephone set, the foldable portable telephone set further preferably may comprise three-dimensional image processing means for carrying out a three-dimensional image processing on an image picked up by the pair of front camera portions when the pair of front camera portions is disposed right and left in the vicinity of the display portion with the display portion put into the oblong state. The upper unit further may comprise a rear camera portion at a rear face thereof. Instead of comprising the rear camera portion at the rear face of the upper unit, the hinge-type connector may comprise a rear camera portion at a rear face thereof.

DESCRIPTION OF THE PREFERRED EMBODIMENTS

Figures 1A, 1B, 1C:
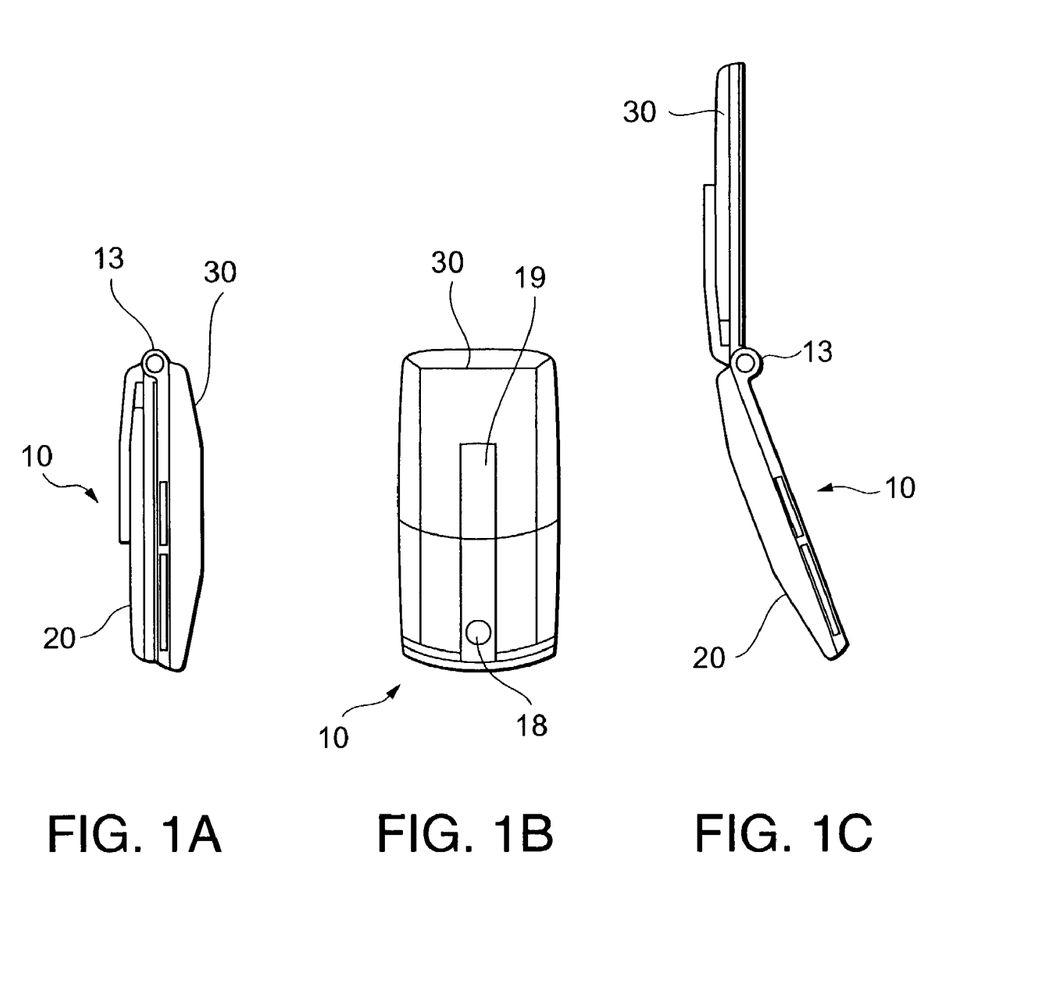
FIG. 1A is a side view showing a closed state of a foldable portable telephone set according to a first embodiment of this invention.
FIG. 1B is an elevational view showing the closed state of the foldable portable telephone set according to the first embodiment of this invention.
FIG. 1C is a side view showing an opened state of the foldable portable telephone set according to the first embodiment of this invention.
Figure 2A:
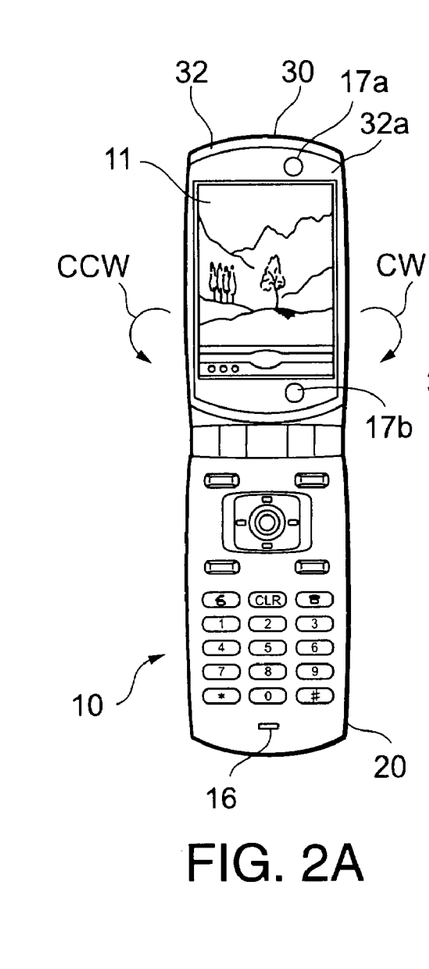
FIG. 2A is an elevational view showing the opened state of the foldable portable telephone set according to the first embodiment of this invention.
Figure 2B:
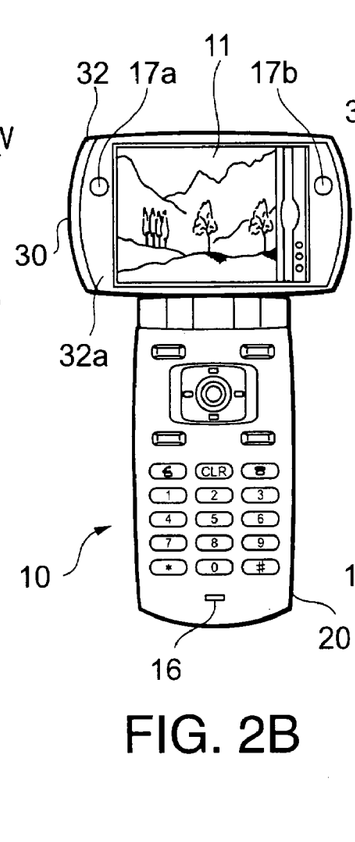
FIG. 2B is an elevational view showing the opened state of the foldable portable telephone set according to the first embodiment of this invention when a display portion is put into an oblong state by rotating a display portion unit counterclockwise by about 90 degrees.
Figure 2C:
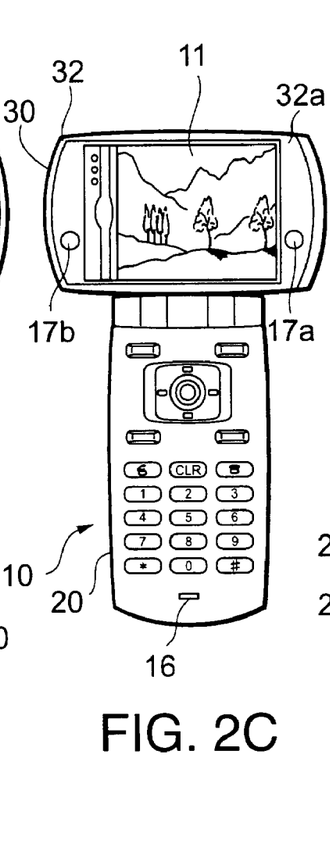
FIG. 2C is an elevational view showing the opened state of the foldable portable telephone set according to the first embodiment of this invention when the display portion is put into the oblong state by rotating the display portion unit clockwise by about 90 degrees.
Figure 2D:
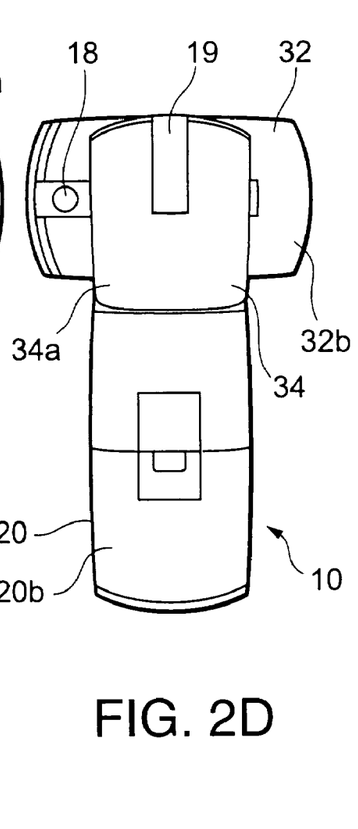
FIG. 2D is a rear elevation of FIG. 2B.
Figure 3:
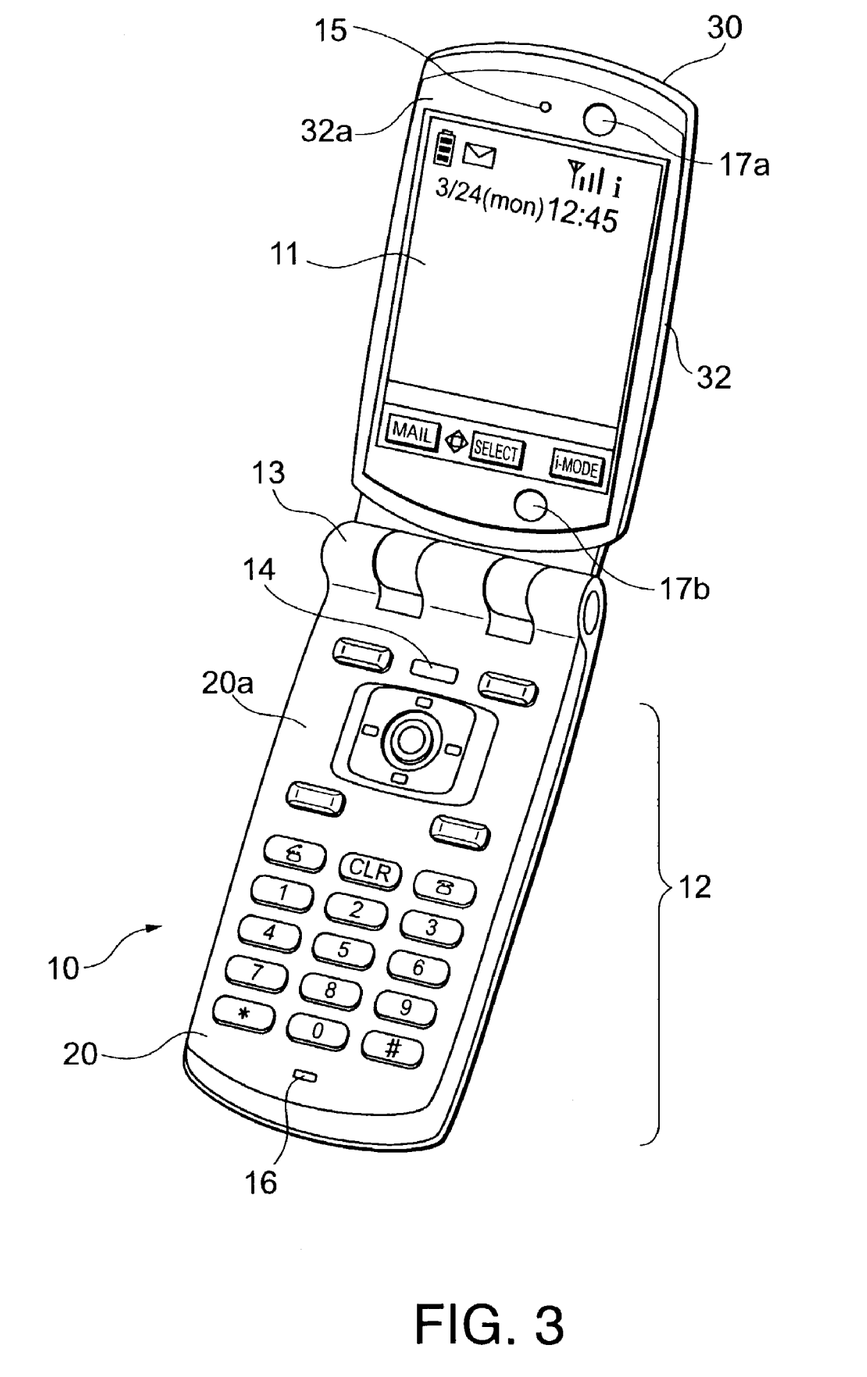
FIG. 3 is a perspective view showing the opened state of the foldable portable telephone set according to the first embodiment of this invention.

Referring to FIGS. 1A through 1C, 2A through 2D, and 3, the description will proceed to a foldable portable telephone set 10 according to a first embodiment of this invention. FIG. 1A is a side view showing a closed state of the foldable portable telephone set 10 according to the first embodiment of this invention. FIG. 1B is an elevational view showing the closed state of the foldable portable telephone set 10 according to the first embodiment of this invention. FIG. 1C is a side view showing an opened state of the foldable portable telephone set 10 according to the first embodiment of this invention. FIG. 2A is an elevational view showing the opened state of the foldable portable telephone set 10 according to the first embodiment of this invention. FIG. 2B is an elevational view showing the opened state of the foldable portable telephone set 10 according to the first embodiment of this invention when a display portion is put into an oblong state by rotating a display portion unit counterclockwise CCW by about 90 degrees. FIG. 2C is an elevational view showing the opened state of the foldable portable telephone set 10 according to the first embodiment of this invention when the display portion is put into the oblong state by rotating the display portion unit clockwise CW by about 90 degrees. FIG. 2D is a rear elevation of FIG. 2B. FIG. 3 is a perspective view showing the opened state of the foldable portable telephone set 10 according to the first embodiment of this invention.

The illustrated foldable portable telephone set 10 mainly comprises, as shown in FIG. 3, a lower unit 20 having a console portion 12, an upper unit 30 having a display portion 11, and a hinge portion 13 for joining the lower unit 20 and the upper unit 30 so as to open and close and for electrically connecting both by a suitable connecting arrangement (not shown).

The lower unit 20 has a main surface (a console face) 20a on which the console portion 12 and a fingerprint certifying portion 14 are disposed. The console portion 12 comprises a plurality of console keys for using functions of the foldable portable telephone set 10. The fingerprint certifying portion 14 is for carrying out a reading of a fingerprint of a user. The console face 20a has a tip part on which a transmitter (a microphone) 16, namely, an opening of the microphone.

On the other hand, the upper unit 30 mainly comprises the display portion unit 32 and a supporting portion unit 34. The display portion unit 32 and the supporting portion unit 34 are electrically and structurally connected to each other by a suitable rotating and sliding mechanism which will later be described.

Figure 4A:
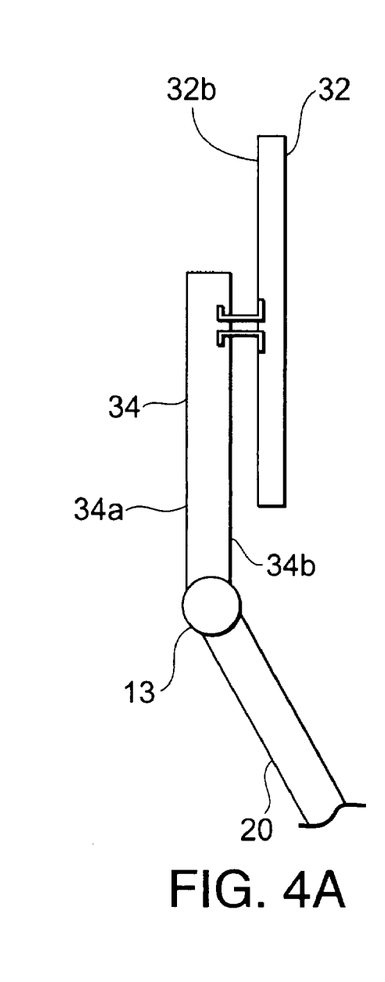
FIG. 4A is a sectional view of FIG. 1C.
Figure 4B:
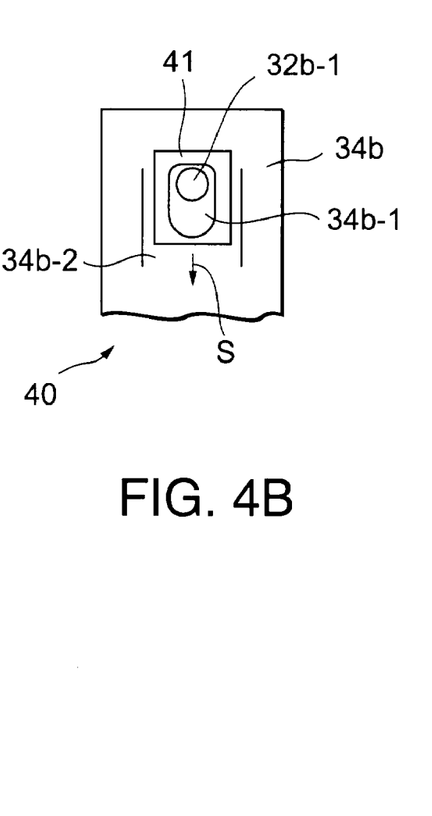
FIG. 4B is an elevational view showing a rotating and sliding mechanism for use in the foldable portable telephone set according to the first embodiment of this invention.
Figure 4C:
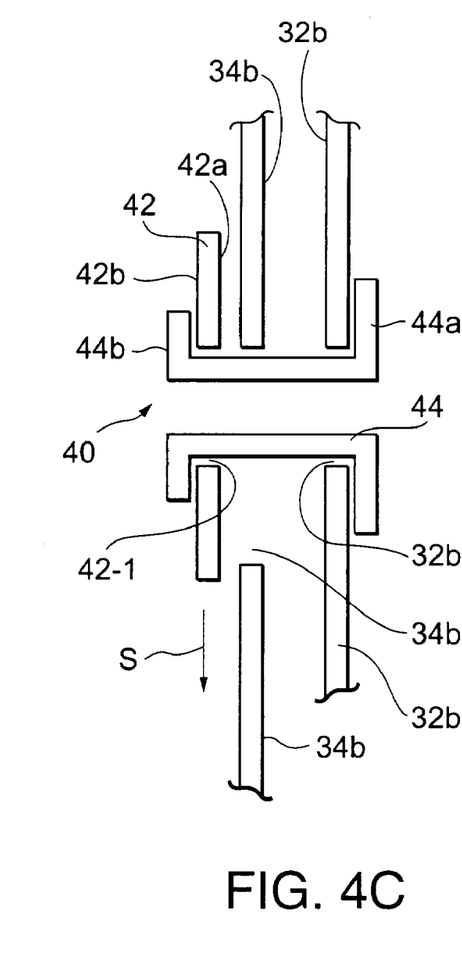
FIG. 4C is an enlarged sectional view showing the rotating and sliding mechanism enlarged.

Referring to FIGS. 4A, 4B, and 4C, the description will proceed to the rotating and sliding mechanism depicted at 40. FIG. 4A is a sectional view of FIG. 1C. FIG. 4B is an elevational view showing the rotating and sliding mechanism 40. In FIG. 4B, a rotating shaft 44 is omitted. FIG. 4C is an enlarged sectional view showing the rotating and sliding mechanism 40 enlarged.

As shown in FIG. 4A, the rotating and sliding mechanism 40 is disposed between the display portion unit 32 and the supporting portion unit 34. As shown in FIG. 4C, the display portion unit 32 has a rear face 32b having a circular hole 32b-1 while the supporting portion unit 34 has a front face 34b having a lengthwise oval hole 34b-1. In addition, as shown in FIG. 4C, the front face 34b of the supporting portion unit 34 has an inner wall on which a slide plate 42 having a circular hole 42-1 is disposed. The slide plate 42 is slidably fitted to the inner wall of the front face 34b of the supporting portion unit 34 up and down in a lengthwise groove 34b-2 formed therein, as shown in FIG. 4B. That is, the slide plate 41 has a front face (a slide face) 42a which is slidably in contact with the inner wall of the front face 34b of the supporting portion unit 34.

The rotating and sliding mechanism 40 comprises the above-mentioned slide plate 42 and a hollow cylindrical rotation shaft 44 passing through the circular hole 32b-1, the oval hole 34b-1, and the circular hole 42-1. The rotation shaft 44 has both ends 44a and 44b each of which is composed of a flange portion bent outwards in a radial direction, as shown in FIG. 4C. That is, one flange portion 44a is rotatably in contact with an inner wall of the rear face 32b of the display portion unit 32 while another flange portion 44b is rotatably in contact with a rear face 42b of the slide plate 42.

With this structure, it is possible to shift from the display portion 11 put into the lengthwise state as shown in FIG. 2A to the display portion 11 put into the oblong state as shown in FIG. 2B by rotating the display portion unit 32 counter-clockwise CCW by about 90 degrees and by sliding downwards S by the rotating and the sliding mechanism 40. In addition, it is possible to shift from the display portion 11 put into the lengthwise state as shown in FIG. 2A to the display portion 11 put into the oblong state as shown in FIG. 2C by rotating the display portion unit 32 clockwise CW by about 90 degrees and by sliding downwards S by the rotating and the sliding mechanism 40. In as much as the display portion unit 32 is not only rotated but also slid in a case of making the display portion 11 from the lengthwise state to the oblong state, the foldable portable telephone set is advantageous in that it is possible to compact the display portion in the oblong state and it is attractive.

Although a switching of the display portion 11 between the lengthwise state and the oblong state is carried out by the rotating and sliding the display portion unit 32 using the rotating and sliding mechanism 40, such a switching may be merely carried out by rotating the display portion unit 32 using a rotating mechanism. Such a rotating mechanism may be easily implemented by omitting a sliding mechanism from the rotating and sliding mechanism 40.

The rotation shaft 44 is hollow through which wiring for electrically connecting the display portion unit 32 with the supporting portion unit 34 passes.

The display portion unit 32 has a main surface (a display face) 32a on which the display portion 11 having a substantially rectangular shape is disposed. In addition, the display face 32 has a tip part on which a receiver 15 (an opening portion of a speaker) is disposed. When the display portion 11 is put into the lengthwise state, a pair of front camera portions 17a and 17b is disposed on the display portion 11 up and down, as shown in FIG. 2A. When the display portion 11 is put into the oblong state by rotating and sliding the display portion unit 32 by the rotating and sliding mechanism 40, the pair of front camera portions 17a and 17b is disposed on the display portion 11 right and left, as shown in FIG. 2B or FIG. 2C. The display portion unit 32 has another main surface (a rear face) 32b on which a rear camera portion 18 is disposed, as shown in FIG. 2D. The supporting portion unit 34 has an opposite face (a rear face) 34a, which is opposed to the display face, on which a small sub-display unit 19 is mounted.

Referring now to FIGS. 1A through 4, description will be made as regards operation of the foldable portable telephone set 10 according to the first embodiment of this invention.

According to the foldable portable telephone set 10 according to the first embodiment of this invention, it is possible to use as the display portion 11 put into the oblong state by rotating and sliding the display portion 11 by the rotating and sliding mechanism 40 as shown in FIG. 2B or FIG. 2C on stating an application such as a browser function for the Internet or the like, an electric mail function (mail creation, display of a received mail or the like), a function of a schedule management, and so on, on recording of voice or images, on reproducing (receiving) contents or the like. It is therefore possible to be easy to see display information comparison with a case where a display screen is put into the lengthwise state (FIG. 2A).

More specifically, on using a predetermined function with display, it is possible to the display portion 11 as an oblong display device by shifting the display portion unit 22 having the display portion 11 from a state illustrated in FIG. 2A to a state illustrated FIG. 2B or FIG. 2C by rotating and sliding the display portion unit 22 by the rotating and sliding mechanism 40 if a user desires. In this event, a control portion which will later be described detects that the display portion 11 is put into the oblong state and displays on the display portion 11 display contents which are suitably converted so as to fit a direction of the display screen put into the oblong state.

Figure 5:
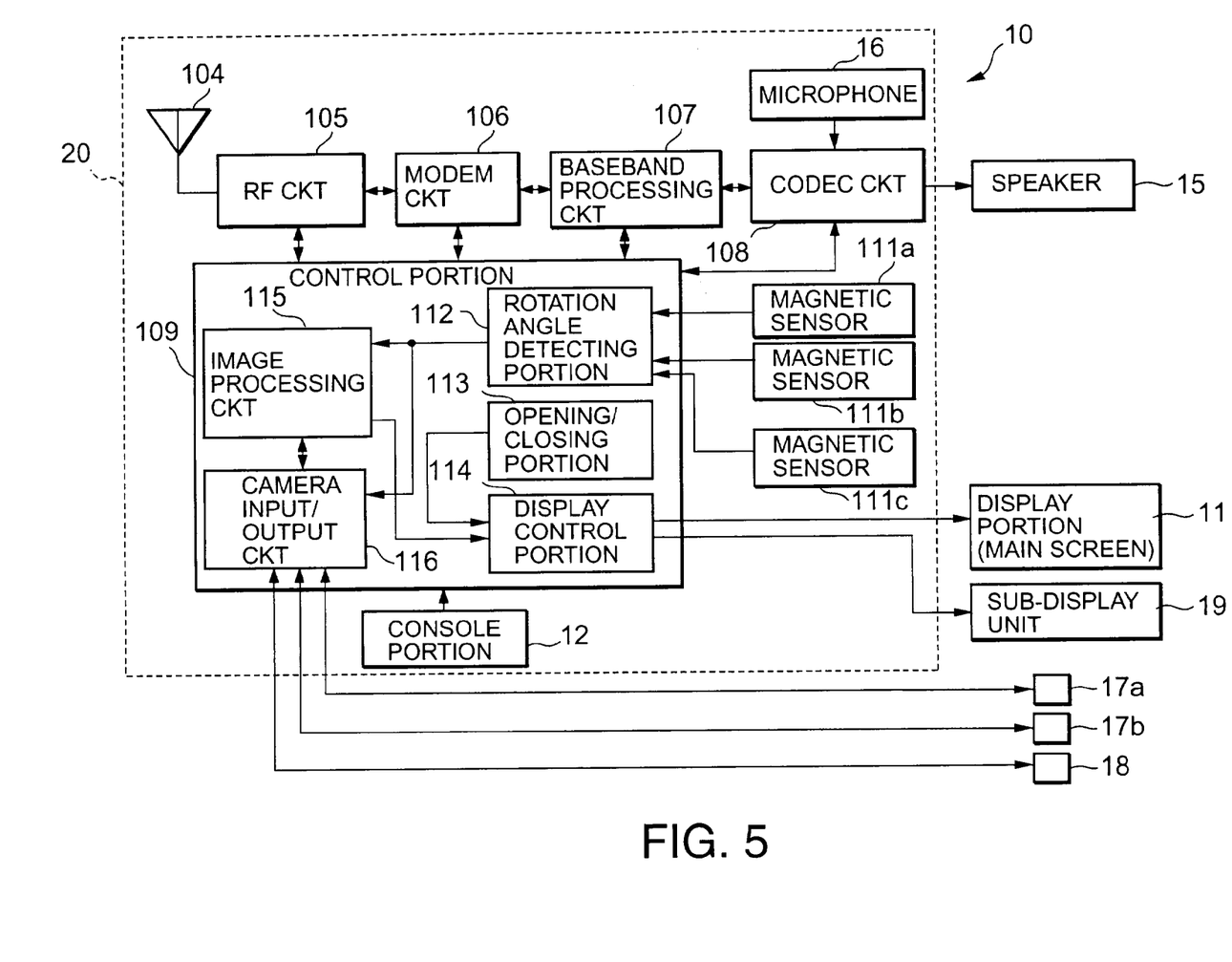
FIG. 5 is a circuit block diagram showing an electric circuit portion of the foldable portable telephone set according to the first embodiment of this invention.

Referring now to FIG. 5, the description will proceed to an electric circuit portion corresponding to the above-mentioned mechanism in the foldable portable telephone set 10 according to the first embodiment of this invention.

As shown in a circuit diagram of FIG. 5, the illustrated foldable portable telephone set 10 comprises an antenna 104, a radio frequency (RF) circuit 105, a modem circuit 106, a baseband processing circuit 107, a codec circuit 108, the control portion 109, the microphone 16, the console portion 12, and first through third magnetic sensors (Hall elements) 111a, 111b, and 111c for detecting a position of the display portion unit 32. Those respective function portions are packed in the lower unit 20.

The above-mentioned control portion 109 comprises a rotation angle detecting portion 112, an opening and closing detecting portion 113, a display control portion 114, an image processing circuit 115, and a camera input/output control circuit 116. The rotation angle detecting portion 112 decides an rotation angle (a rotation position) of the display portion unit 32 on the basis of outputs of the first through the third magnetic sensors 111a to 111c to produce a rotation angle detected signal. The opening and closing detecting portion 113 detects an opening and closing state of the upper unit 30 including the display portion unit 32 with respect to the lower unit 20. The display control portion 114 performs control for display of an image signal from the image processing circuit 115. In addition, the display control portion 114 performs display switching of the display portion 11 and the sub-display unit 19 in response to an output of the opening and closing detecting portion 113. The image processing circuit 115 performs an image processing in accordance with an rotation operation of the display portion unit 32 and a camera control operation. Connected to the front camera portions 17a, 17b and the rear camera portion 18, the camera input/output control circuit 116 performs a camera input/output control in accordance with the rotation angle detected signal of the display portion unit 32.

The RF circuit 105 comprises a receiving circuit, a transmitting circuit, and a frequency synthesizer which are not shown. The console portion 12 comprises a known transmission key, a conversion key for alphabet/kana (Japanese syllabary)/kanji (Chinese characters)/numeral, an on/off key for a power supply, a direction indication key (a scroll key) for carrying out cursor operation, a key for performing on/off of the camera, and so on.

The foldable portable telephone set 10 according to the first embodiment of this invention further comprises the speaker 15, the display portion (a liquid crystal display (LCD) or an electroluminescence (EL) element) 11 serving as a main screen, and the sub-display unit 19.

Figure 6:
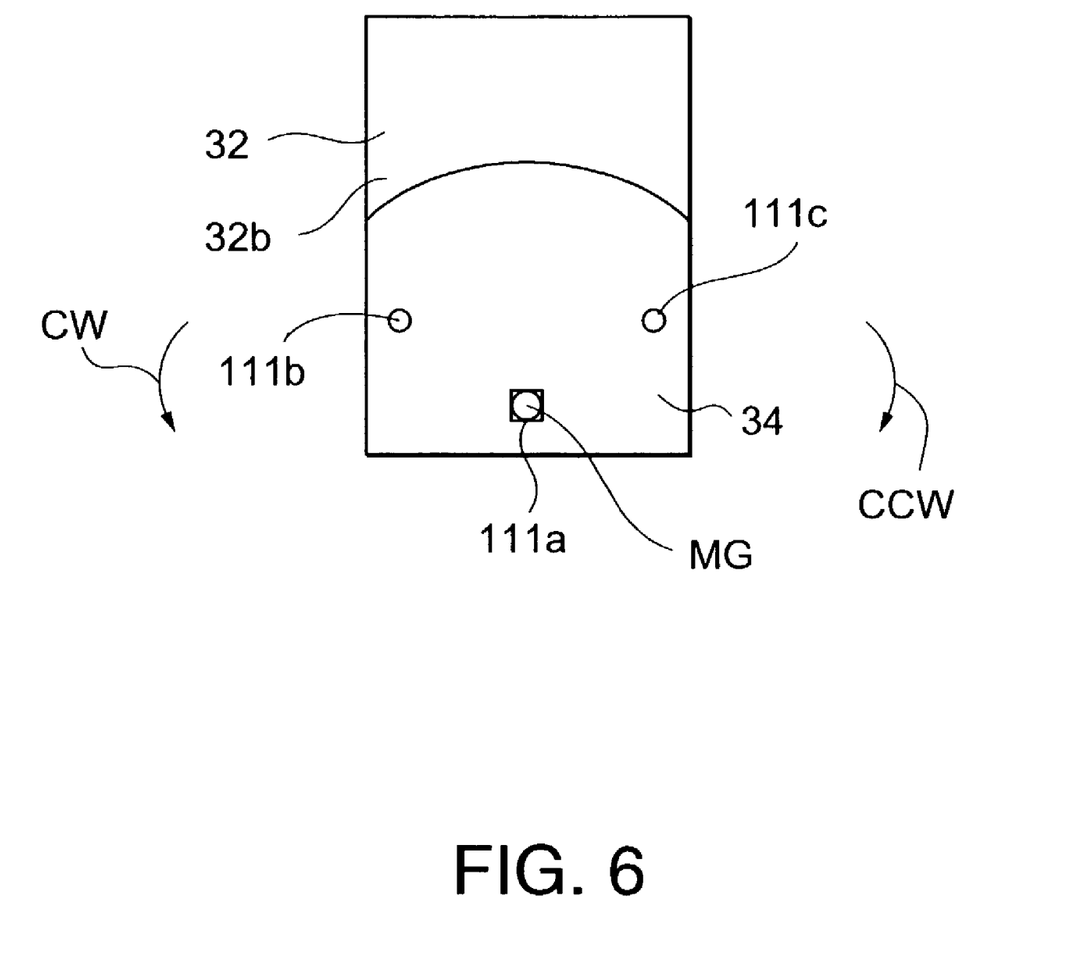
FIG. 6 is a rear schematic view for use in describing an arrangement of magnetic sensors used in the foldable portable telephone set according to the first embodiment of this invention.

Referring to FIG. 6, description will be made as regards the above-mentioned first through third magnetic sensors 111a to 111c for detecting a posture (the rotation angle, the rotation position) of the display portion unit 32 according to the first embodiment of this invention. FIG. 6 is a rear schematic view for use in describing an arrangement of the first through the third magnetic sensors 111a to 111c used in the foldable portable telephone set 10 according to the first embodiment of this invention.

As shown in FIG. 6, the display portion unit 32 has the rear face 32b in which a magnet MG is disposed. On the other hand, the supporting portion unit 34 has the front face 34b in which the first through the third magnetic sensors 111a to 111c are disposed.

It will be assumed that the display portion 11 is put into the lengthwise state (FIG. 2A). In this event, the magnet MG and the first magnetic sensor 111a are opposite to each other as shown in FIG. 6. That is, by detecting magnetism of the magnet MG by the first magnetic sensor 111a, it is possible to detect that the display portion 11 is put into the lengthwise state.

It will be assumed that the display portion 11 is put into the oblong state (FIG. 2B) by rotating and sliding the display portion unit 32 from the state shown in FIG. 6 counterclockwise CCW by about 90 degrees by the above-mentioned rotating and sliding mechanism 40. Under the circumstances, the magnet MG and the second magnetic sensor 111b are opposite to each other. That is, by detecting magnetism of the magnet MG by the second magnetic sensor 111b, it is possible to detect that the display portion 11 is put into the oblong state where the display portion 11 is rotated counterclockwise by about 90 degrees with respect to the lengthwise state.

It will be assumed that the display portion 11 is put into the oblong state (FIG. 2C) by rotating and sliding the display portion unit 32 from the state shown in FIG. 6 clockwise CW by about 90 degrees by the above-mentioned rotating and sliding mechanism 40. Under the circumstances, the magnet MG and the third magnetic sensor 111c are opposite to each other. That is, by detecting magnetism of the magnet MG by the third magnetic sensor 111c, it is possible to detect that the display portion 11 is put into the oblong state where the display portion 11 is rotated clockwise by about 90 degrees with respect to the lengthwise state.

Although the rotation angle position of the display portion unit 32 is detected using the magnetic sensors in the first embodiment of this invention, of course, detection of the rotation angle portion may not be restricted them. For instance, other sensors such as reed switches, optical sensors, or the like may be used in lieu of the magnetic sensors.

In a folded state where the display face 32a of the upper unit 30 is opposite to the lower unit 20 as shown in FIGS. 1A and 1B, the foldable portable telephone set 10 becomes compact so that the whole of the foldable portable telephone set 10 is convenient to carry with it in the similar manner in a folded state of a conventional foldable portable telephone set. In this event, by detecting opening and closing by the opening and closing detecting portion 113, the display control portion 114 controls the display portion 11 and the sub-display unit 19. More specifically, the display control portion 114 controls to display information on the display portion 11 when the upper unit 30 is opened with respect to the lower unit 20. The display control portion 114 controls to display information having a minimum range on the sub-display unit 19 when the upper unit 30 is closed with respect to the lower unit 20. When the upper unit 30 is opened with respect to the lower unit 20, it is possible to speak over using the microphone 16 and the speaker 15.

The display portion 11 is put into the oblong state when the display portion unit 32 is rotated from the state shown in FIG. 2A counterclockwise CCW by about 90 degrees in the manner as shown in FIG. 2B. In addition, the display portion 11 is put into the oblong state when the display portion unit 32 is rotated from the state shown in FIG. 2A clockwise CW by about 90 degrees in the manner as shown in FIG. 2C.

In a case where the display portion unit 32 is put into such a position relationship, the above-mentioned rotation angle detecting portion 112 detects this position relationship, the image processing circuit 115 generates the image signal suitable to the oblong screen in response to this detection, and the display control portion 114 displays display contents to be displayed on the display portion 11 in the oblong state (or display right and left of the display contents as a long side direction of the display portion 11). In this event, if there is a directivity in the console portion 12 for processing corresponding to operation such as the direction key (cursor key), corresponding processing contents are suitable to the display direction.

In the state of FIG. 2B or FIG. 2C, confirmation of a large quantity of character information is easily carried out by the oblong display face and it is easy to see when an oblong image is displayed. In the manner which is described above, it is possible for the foldable portable telephone set 10 according to the first embodiment of this invention to see the display in the opened state with the display portion 11 put into the oblong state and to suitably operate as the need arises.

According to the foldable portable telephone set 10 according to the first embodiment of this invention, the pair of front camera portions 17a and 17b is disposed on the main surface (display face) 32a of the display portion unit 32. The pair of front camera portions 17a and 17b is disposed so at to position right and left when the display portion 11 is put into the oblong state by the rotating and sliding mechanism 40 of the display portion unit 32. As a result, it is possible to easily carry out a deformation into a position suitable to 3D image processing (3D image pickup using the pair of front camera portions 17a and 17b disposed to right and left). The 3D image processing will later be described.

According to the foldable portable telephone set 10 according to the first embodiment of this invention, the rear camera portion 18 is disposed on the other main surface (the rear face) 32b of the display portion unit 32 as shown in FIG. 2D. It is possible to easily carry out pickup of the oblong image using the rear camera portion 18. Specifically, in prior art, it is necessary to pick up with the apparatus put into a oblong state in a case of carrying out the pickup of the oblong image (in this event, it is necessary to carry out operation with an oblong state). On the contrary, according to the first embodiment of this invention, it is possible to easily carry out the pickup of the oblong image by rotating the display portion unit 32.

In addition, it is possible to suitably select the pair of front camera portions 17a and 17b and the rear camera portion 18 in accordance with a stop state (an arrangement state) of the display portion unit 32 by arbitrary setting of a user in the manner which will later be described. For example, it is possible to set by operating the console portion 12 so as to operate one front camera portion 17a and the rear camera portion 18 in the state illustrated in FIG. 2A. It is possible to set by operating the console portion 12 so as to operate the pair of front camera portions 17a and 17b in the state illustrated in FIG. 2B. It is possible to set by operating the console portion 12 so as to operate only the rear camera portion 18 in the state illustrated in FIG. 2C. Therefore, it is possible to easily carry out to set a pickup mode (camera selection and allocation of key function accompanied by the camera selection).

Figure 7:
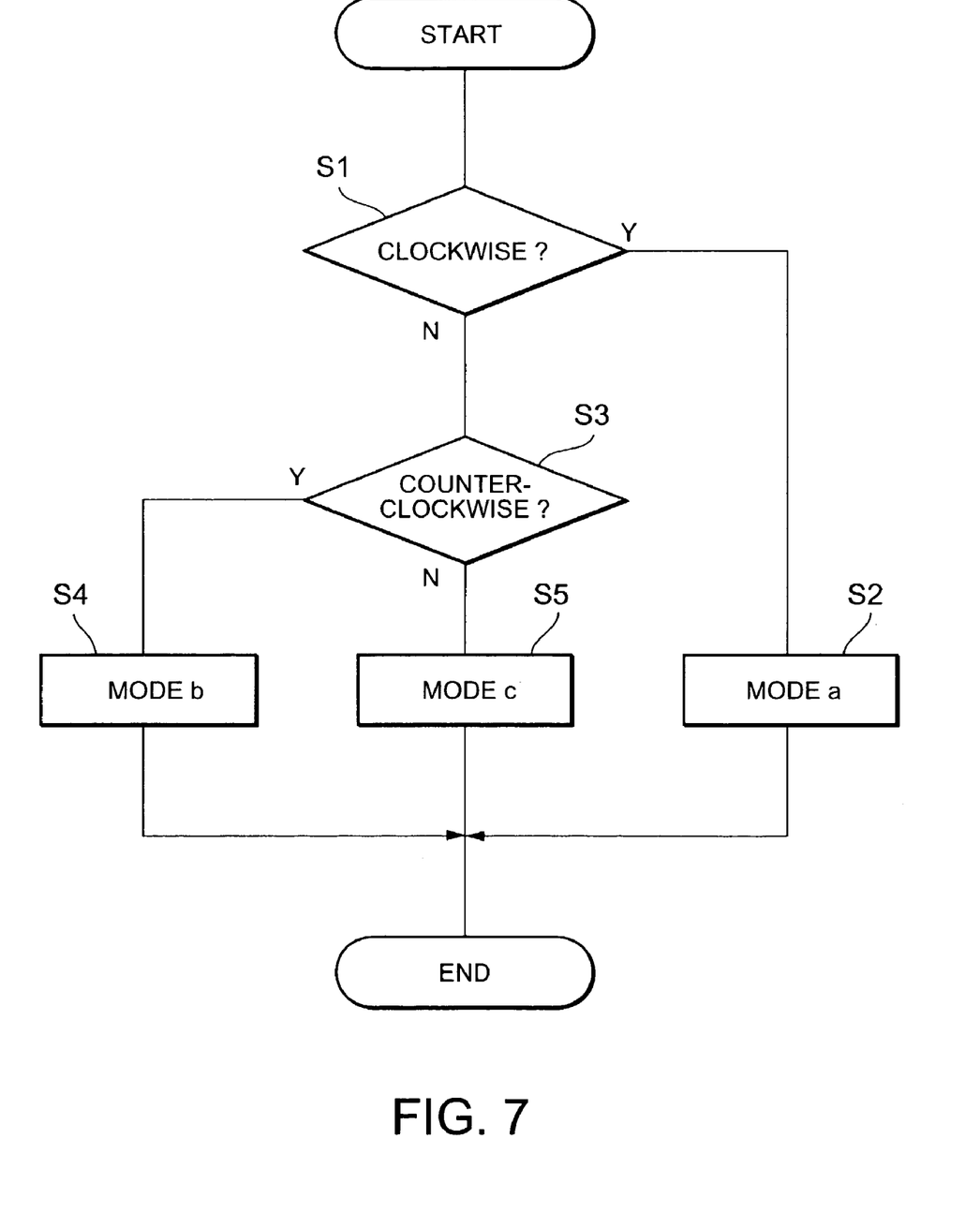
FIG. 7 is a flow chart for use in describing a switching operation of a display mode in accordance with detection of a rotation position of a display portion unit by a rotation angle detecting portion illustrated in FIG. 6.

Referring to FIG. 7, description will be made as regards a switching operation of a display mode in accordance with detection of the rotation position of the display portion unit 32 by the rotation angle detecting portion 112. In the example being illustrated, inasmuch as the foldable portable telephone set 10 is provided with the first through the third magnetic sensors 111a–111c, it is possible to switch the display mode into three modes (a mode a, a mode b, and a mode c).

More specifically, it will be assumed that the display portion 11 is put into the oblong state where the display portion 11 is rotated clockwise CW by 90 degrees, as shown in FIG. 2C. The third magnetic sensor 111c detects this state to produce a magnetic clockwise rotation detected signal which is supplied to the rotation angle detecting portion 112. Responsive to the magnetic clockwise rotation directed signal, the rotation angle detecting portion 112 sends a clockwise rotation detected signal indicating that the display portion 11 is rotated clockwise to the image processing circuit 115 and the camera input/output control circuit 116 (Y in a step A1). Responsive to the clockwise rotation detected signal, the image processing circuit 115 and the camera input/output control circuit 116 set the display mode into the mode a (a step S2).

It will be assumed that the display portion 11 is put into the oblong state where the display portion 11 is rotated counterclockwise CCW by 90 degrees, as shown in FIG. 2B. The second magnetic sensor 111b detects this state to produce a magnetic counterclockwise rotation detected signal which is supplied to the rotation angle detecting portion 112. Responsive to the magnetic counterclockwise rotation directed signal, the rotation angle detecting portion 112 sends a counterclockwise rotation detected signal indicating that the display portion 11 is rotated counterclockwise to the image processing circuit 115 and the camera input/output control circuit 116 (Y in a step A3). Responsive to the counterclockwise rotation detected signal, the image processing circuit 115 and the camera input/output control circuit 116 set the display mode into the mode b (a step S4).

It will be assumed that the display portion 11 is put into the lengthwise state where the display portion 11 is not rotated, as shown in FIG. 2A. The first magnetic sensor 111c detects this state to produce a magnetic nonrotation detected signal which is supplied to the rotation angle detecting portion 112. Responsive to the magnetic nonrotation directed signal, the rotation angle detecting portion 112 sends a nonrotation detected signal indicating that the display portion 11 is not rotated to the image processing circuit 115 and the camera input/output control circuit 116 (N in the step S1, N in the step S3). Responsive to the nonrotation detected signal, the image processing circuit 115 and the camera input/output control circuit 116 set the display mode into the mode c (a step S5).

Now, the description will proceed to examples of a switching of the camera portions where a user can set as the modes a–c and actual image displays in the display portion 11 in this event. It seems that there are, as the image displays, four image displays (camera modes, pickup modes) which will later be described. A first camera mode [1] is a mode for displaying a 3D image using the pair of front camera portions 17a and 17b. A second camera mode [2] is a mode for displaying a front image using only one of the front camera portions 17a and 17b. A third camera mode [3] is a mode for displaying a rear image using only the rear camera portion 18. A fourth camera mode [4] is for dividedly displaying the front image and the rear image using one of the front camera portions 17a and 17b and the rear camera portion 18. That is, the user operates the console portion 12 to selectively set the first through the fourth camera modes [1]–[4] to the modes a–c. It is noted that the second through the fourth camera modes [2]–[4] are allocated to any one of the modes a–c but only the first camera mode [1] is allocated to either the mode a or the mode b.

Now, the description will proceed to the 3D image processing. The description will be made by mentioning a case where the first camera mode [1] is selected and set as the mode b. In other words, it will be assumed that setting is made so as to display the 3-D image on the display portion 11 when the display portion 11 is put into the oblong state where the display portion 11 is rotated counterclockwise (FIG. 2B).

The 3D image processing may be implemented by using a technique described, for example, in the above-mentioned prior art document 4 (JP-A 9-116882). However, it is necessary to display the 3-D image and a normal image (2D image) by switching them in the first embodiment of this invention.

The display portion 11 comprises a screen (not shown) and a mask (not shown) disposed on a front face of the screen (i.e. between the screen and a user). The screen is divided into a plurality of longitudinal strip-like divided screens on which a left eye image and a right eye image are alternately displayed. The mask comprises a plurality of slits each having a width which corresponding to that of each divided screen.

With this structure, a left eye of a user sees the left eye image which is not covered by the mask while a right eye of the user sees the right eye image which is not covered by the mask. When the left eye image and the right eye image are an image obtained by picking up the same object and shift a little in angle, the user recognizes so as to see the 3-D image.

In the first embodiment of this invention, a liquid crystal shutter (a liquid crystal mask) is used at the mask. More specifically, in a case of displaying the 3-D image on the display portion 11, the liquid crystal mask is controlled so that a plurality of slits are formed therein. In a case of displaying the normal image (the 2-D image) on the display portion 11, the liquid crystal mask is controlled so that the liquid crystal mask becomes transparent. A mode switching of the liquid crystal mask is controlled by the display control portion 114. It is therefore possible to selectively display the 3-D image and the 2-D image.

In addition, the above-mentioned 3-D image processing is called a parallax barrier (parallax stereogram) method in the art. That is, in the parallax barrier method, prior to an image where a pair of left eye image and right eye image is arranged in a strip fashion, a parallax barrier having slits corresponding to this image is disposed, a left eye and a right eye can observe the left eye image and the right eye image through the slits, respectively. That slits (thin film image splitter) are arranged in a liquid crystal panel is sold as a product.

In addition, a display device selectively displaying the 2-D image and the 3-D image on a single screen is disclosed, for example, in Japanese Unexamined Patent Publication Tokkai Nos. Hei 10-232,366 or JP-A 10-232366 and Hei 10-221,646 or JP-A 10-221646, in U.S. Pat. No. 5,831,765, and so on.

Now, description will be made as regards operation of the foldable portable telephone set 10 in a case of carrying out transmission and reception of a speech signal using a function as a telephone set. The antenna 104 receives a signal from a base station and transmits a signal from the foldable portable telephone set 10. Received by the antenna 104, the signal from the base station is supplied to the receiving circuit of the RF circuit 105. The receiving circuit selects a signal having a frequency indicated by the frequency synthesizer and detects whether or not an incoming call notification signal for its own is included in the selected signal (waiting reception).

When the receiving circuit detects the incoming call notification signal for its own, the receiving circuit notifies the control portion 109 that an incoming call is present. Responsive to notification where the incoming call is present in its own from the receiving circuit, the control portion 109 drives alert means (not shown) such as a call bell, a vibrator, or the like or the speaker 15 to notify a user that the incoming call is present in its own.

In the foldable portable telephone set 10 according to the first embodiment of this invention, when a replay is made by pushing a telephone call button with the upper unit 30 and the lower unit 20 opened on the incoming call, a radio circuit is connected, the speech signal transmitted from an outgoing caller is supplied to the modem circuit 106 through the RF circuit 105.

Subsequently, the modem circuit 106 demodulates the speech signal transmitted from the outgoing caller to supply a demodulated signal to the baseband processing circuit 107. The baseband processing circuit 107 extracts an original baseband signal from the demodulated signal to supply the original baseband signal to the codec circuit 108. The codec circuit 108 performs an digital-to-analog conversion on a supplied baseband signal to supply a digital signal to the speaker (the receiver) 15. As a result, a speech transmitted from the outgoing caller is generated from the speaker 15. The codec circuit 108 carries out an analog-to-digital conversion processing on a speech signal converted by the microphone 16 to be transmitted from the foldable potable telephone set 10. Therefore, the users can carry out telephone conversation.

An on-hook processing is carried out by carrying out an on-hook operation using a predetermined on-hook key by the user when the telephone conversation comes to end.

Now, description will be made as regards operation in a case of carrying out transmission and reception of character data or image data (a still image or a moving image) in the foldable portable telephone set 10. The foldable portable telephone set 10 monitors (waits) whether or not a signal indicative of presence of transmission of the character data or the image data for its own is included in the selected signal. When the character data or the image data are transmitted to the foldable portable telephone set 10 for its own, information on the basis of received data from the baseband processing circuit 107 is temporarily stored in the image processing circuit 115 and is displayed on the display portion 11 through the display control portion 114.

More specifically, transmitted from the outgoing caller, the character data or the image data are supplied to the modem circuit 106 through the RF circuit 105. The modulated data are supplied the baseband processing circuit 107. The baseband processing circuit 107 extracts transmitted data such as the character data from the supplied signal to supply extracted data to the control portion 109.

The image processing circuit 115 of the control portion 109 comprises a CPU, an ROM, an RAM, and a VRAM although illustrate is not made. The ROM stores an execution program, data necessary for various types of processing or character font data. The RAM is used as a work area. The VRAM is for displaying information on the display portion 11.

On the basis of the data supplied from the baseband processing circuit 107, the image processing circuit 115 creates character information or an image signal to be displayed on the display portion 11 (or the sub-display unit 19 as the need arises) and displays them on the display portion 11 through the display control portion 114.

In addition, the foldable portable telephone set 10 may create message data in its own to transmit them. More specifically, in the foldable portable telephone set 10 according to this embodiment, dial operation keys such as 0–9, *, # disposed in the console portion 12 are allocated with alphabetic characters or kana characters and the console portion 12 has the conversion key for alphabet/kana/kanji/numeral. By operating a group of the dial operation keys or the conversion key, it is possible to input the message data and to transmit them to the opposite party according to indication from the user.

The foldable portable telephone set 10 illustrated in FIG. 5 can carry out dual reception of the speech signal and the image signal so as to receive and display an image from the opposite party and to transmit its own image during the telephone conversation. As a result, the foldable portable telephone set 10 may use as a television portable telephone. Under the circumstance, it is possible to use one of the front camera portions 17a and 17b as a television telephone camera (for picking up image information). In this event, the user may operate the console portion 12 to arbitrarily select one of the front camera portions left and right in accordance with the opposite party of telephone from left and right picking up directions. In this event, it is possible to distinguish between a left-handed expression and a right-handed expression (i.e. a severe expression for business, a gentle expression for private, or the like).

Figures 8A, 8B, 8C:
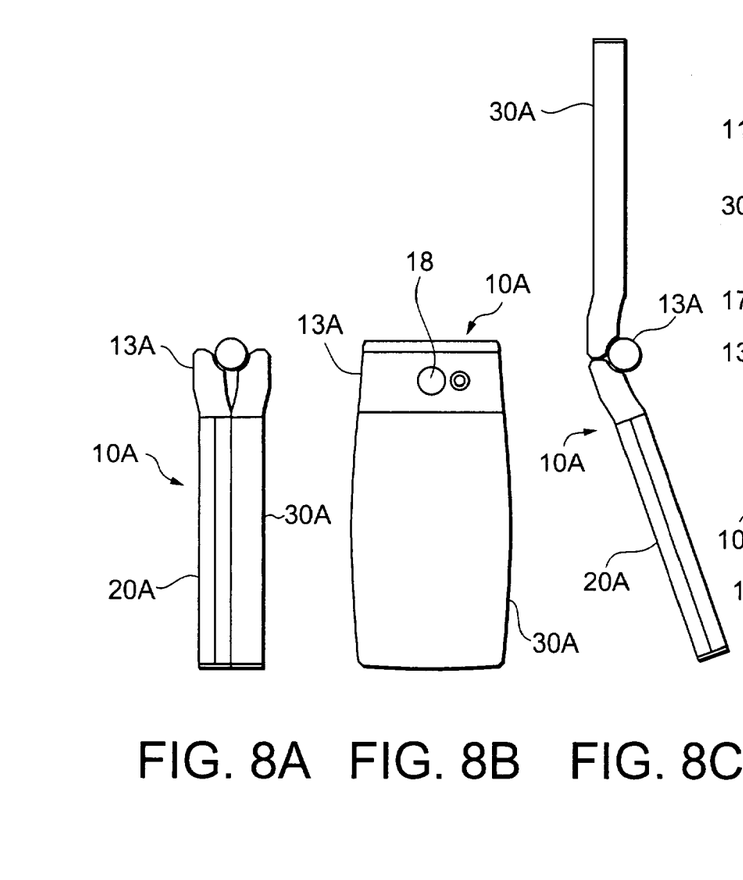
FIG. 8A is a side view showing a closed state of a foldable portable telephone set according to a second embodiment of this invention.
FIG. 8B is an elevational view showing the closed state of the foldable portable telephone set according to the second embodiment of this invention.
FIG. 8C is a side view showing an opened state of the foldable portable telephone set according to the second embodiment of this invention.
Figures 8D, 8E:
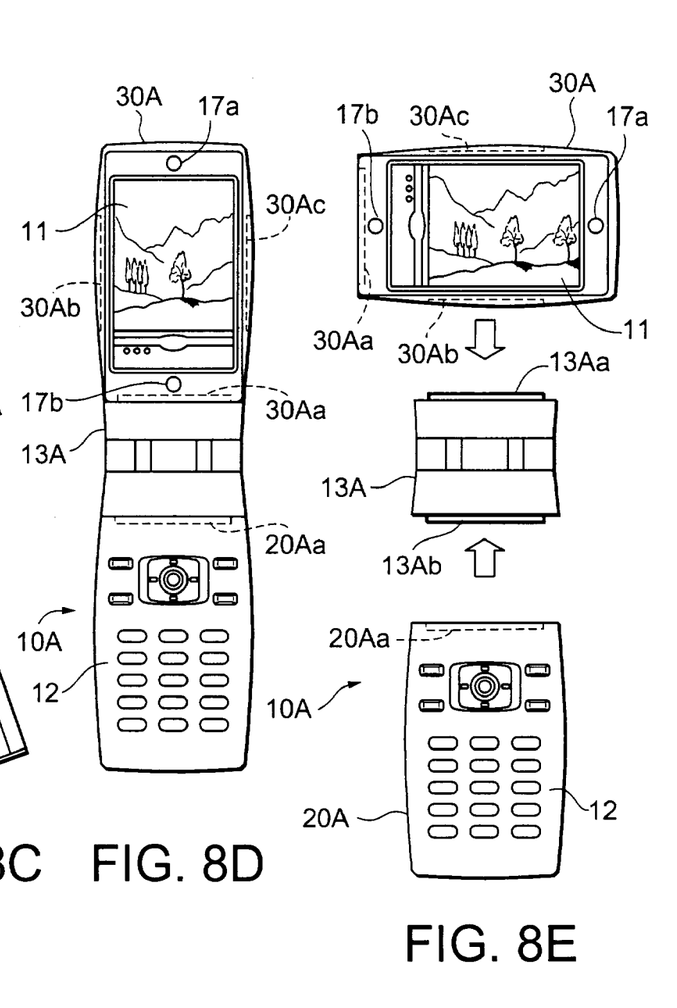
FIG. 8D is an elevational view showing the opened state of the foldable portable telephone set according to the second embodiment of this invention.
FIG. 8E is an elevational view showing the opened state of the foldable portable telephone set according to the second embodiment of this invention when a display portion is put into an oblong state.

Referring to FIGS. 8A through 8E, the description will proceed to a foldable portable telephone set 10A according to a second embodiment of this invention. FIG. 8A is a side view showing a closed state of the foldable portable telephone set 10A according to the second embodiment of this invention. FIG. 8B is an elevational view showing the closed state of the foldable portable telephone set 10A according to the second embodiment of this invention. FIG. 8C is a side view showing an opened state of the foldable portable telephone set 10A according to the second embodiment of this invention. FIG. 8D is an elevational view showing the opened state of the foldable portable telephone set 10A according to the second embodiment of this invention. FIG. 8E is an elevational view showing the opened state of the foldable portable telephone set 10A according to the second embodiment of this invention when a display portion is put into an oblong state.

The illustrated foldable portable telephone set 10A mainly comprises a lower unit 20A having the console portion 12, an upper unit 30A having the display portion 11, and a hinge-type connector 13A for joining the lower unit 20A and the upper unit 30A so as to open and close and for enable to connect the lower unit 20A with the upper unit 30A by changing a connection state of the upper unit 30A with respect to the lower unit 20A.

As shown in FIG. 8E, three components 20A, 30A, and 13A are removable one another. The hinge-type connector 13A has an upper connecting portion 13Aa for connecting to the upper unit 30A. In a state illustrated in FIG. 8D, the upper unit 30A has first and third upper open slits 30Aa, 30Ab, and 30Ac for inserting the upper connecting portion 13Aa of the hinge-type connector 13A at a lower side, a left side, and a right side thereof, respectively. The lower unit 20A has a lower open slit 20Aa for inserting the lower connecting portion 13Ab of the hinge-type connector 13A at an upper side thereof.

Each of the first through the third upper open slits 30Aa, 30Ab, and 30Ac has a connector (not shown) for electrically connecting to the upper connecting portion 13Aa of the hinge-type connector 13A at the inside thereof. The lower open slit 20Aa has a connector (not shown) for electrically connecting to the lower connecting portion 13Ab of the hinge-type connector 13A at the inside thereof.

In the illustrated foldable portable telephone set 10A, the rear camera portion 18 is disposed in a rear face of the hinge-type connector 13A as shown in FIG. 8B.

Figure 9:
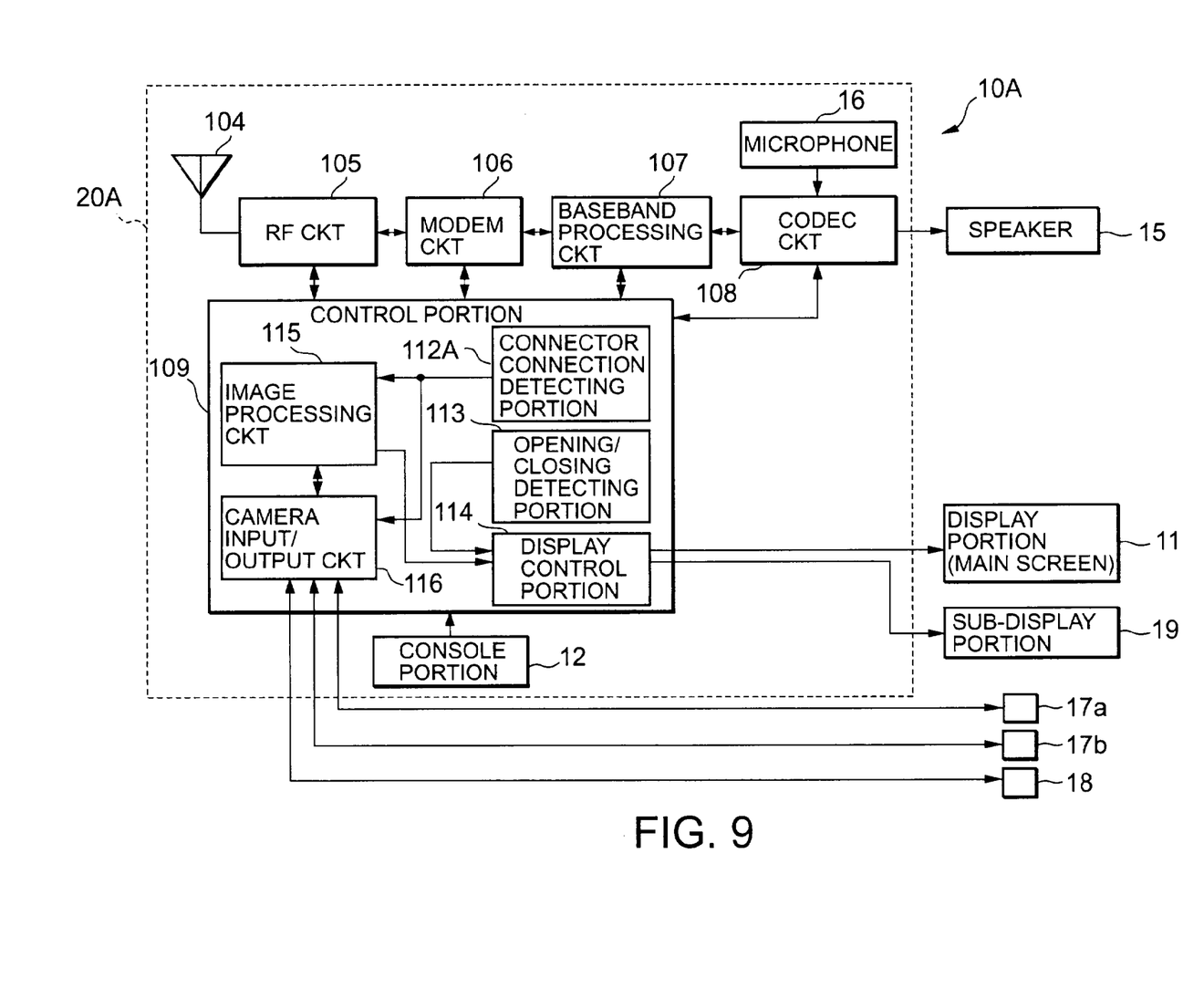
FIG. 9 is a circuit block diagram showing an electric circuit portion of the foldable portable telephone set according to the second embodiment of this invention.

Referring now to FIG. 9, the description will proceed to an electric circuit portion of the foldable portable telephone set 10A according to the second embodiment of this invention. The illustrated foldable portable telephone set 10A is similar in structure and operation to the foldable portable telephone set 10 illustrated in FIG. 5 except that the foldable portable telephone set 10A includes a connector connection detecting portion 112A in lieu of the rotation angle detecting portion 112 and the first through the magnetic sensors 111a to 111c are omitted. Components having functions similar to those illustrated in FIG. 5 are attached with the same reference symbols.

Specifically, inasmuch as the display portion unit 32 in the foldable portable telephone set 10A according to the second embodiment of this invention, which is different from the foldable portable telephone set 10 according to the first embodiment of this invention, does not rotate, the first through the third magnetic sensors 111a to 111c are unnecessary although they are necessary in the foldable portable telephone set 10 according to the first embodiment of this invention.

Although the open slots and the connecting portion 13Aa are disposed in the display portion 11 side and the hinge-type connector 13A side in the second embodiment, respectively, connection structure may be reversed.

While this invention has thus far been described in conjunction with a few embodiments thereof, it will now be readily possible for those skilled in the art to put this invention into practice in various other manners.

What is claimed is:

1. A foldable portable telephone set comprising:
   a lower unit having a console portion, an upper unit having a display portion, and a hinge portion for joining said lower unit to said upper unit for opening and closing, wherein
   said display portion is able to shift arrangement thereof, with respect to a lengthwise direction of said lower unit, between a lengthwise state and an oblong state substantially perpendicular to said lengthwise state,
   said foldable portable telephone further comprising a pair of front camera portions disposed on said upper unit so as to be positioned above and below of said display portion when said display portion is put into the lengthwise state and to be positioned right and left of said display portion when said display portion is put into the oblong state.

2. A foldable portable telephone set as claimed in claim 1, wherein said upper unit further comprises a supporting portion unit, and a rotating mechanism for rotatably connecting said display portion unit and said supporting portion unit,
   wherein said display portion is put into the oblong state by rotating said display portion unit by about 90 degrees using said rotating mechanism in a case where said display portion is in the lengthwise state.

3. A foldable portable telephone set as claimed in claim 1, wherein said upper unit further comprises a supporting portion unit, and a rotating and sliding mechanism connecting said display portion unit and said supporting portion unit for rotating and sliding said display portion unit with respect to said supporting portion unit,
   wherein said display portion is put into the oblong state by rotating said display portion unit by about 90 degrees and by sliding said display portion using said rotating and sliding mechanism in a case where said display portion is put into the lengthwise state.

4. A foldable portable telephone set as claimed in claim 2, further comprising:
   a detecting means for detecting whether said display portion is put into the lengthwise state or the oblong state to produce a detected signal; and
   a display converting means for converting display contents so at to fit to a direction of a display screen according to said detected signal and for displaying converted display contents on said display portion.

5. A foldable portable telephone set as claimed in claim 4, wherein said detecting means comprises a magnet disposed in said display portion unit and a plurality of magnetic sensors disposed in said supporting portion unit.

6. A foldable portable telephone set as claimed in claim 3, further comprising:
   a detecting means for detecting whether said display portion is put into the lengthwise state or the oblong state to produce a detected signal; and
   a display converting means for converting display contents so as to fit to a direction of a display screen according to said detected signal and for displaying converted display contents on said display portion.

7. A foldable portable telephone set as claimed in claim 6, wherein said detecting means comprises a magnet disposed in said display portion unit and a plurality of magnetic sensors disposed in said supporting portion unit.

8. A foldable portable telephone set as claimed in claim 1, wherein said hinge portion is a hinge-type connector for detachably connecting said upper unit-to said lower unit, said hinge-type connector having a connector connection portion for connecting to said upper unit,
   said upper unit having a plurality of unit connection portions for connecting to said connector connection portion at a lower side and lateral sides thereof, whereby said display portion is switched between the lengthwise state and the oblong state by changing the unit connection portions to be connected to said connector connection portion.

9. A foldable portable telephone set as claimed in claim 8, further comprising:
   a detecting means for detecting whether said display portion is put into the lengthwise state or the oblong state to produce a detected signal; and
   display converting means for converting display contents so at to fit to a direction of a display screen according to said detected signal and for displaying converted display contents on said display portion.

10. A foldable portable telephone set as claimed in claim 1, wherein further comprises three-dimensional image processing means for carrying out a three-dimensional image processing on an image picked up by said pair of front camera portions when said pair of front camera portions is disposed right and left in the vicinity of said display portion with said display portion put into the oblong state.

11. A foldable portable telephone set as claimed in claim 1, wherein said upper unit further comprises a rear camera portion at a rear face thereof.

12. A foldable portable telephone set as claimed in claim 11, wherein further comprises pickup mode selecting means for carrying out selection of a pickup mode for using at least one of said pair of front camera portions and said rear camera portion in accordance with a disposed condition of said display portion.

13. A foldable portable telephone set as claimed in claim 11, wherein further comprises selecting means for selecting any one camera portion among said pair of front camera portions and said rear camera portion according to speech destination information when any one of said pair of front camera portions and said rear camera portion is used to a television telephone.

14. A foldable portable telephone set as claimed in claim 1, wherein further comprises selecting means for selecting one of said pair of front camera portions according to a telephone destination when said pair of front camera portions is used as a television telephone camera in a state where said pair of front camera portions is disposed right and left in the vicinity of said display portion with said display portion put into the oblong state.

15. A foldable portable telephone set as claimed in claim 8, wherein said hinge-type connector further comprises a rear camera portion at a rear face thereof.

16. A foldable portable telephone set as claimed in claim 15, further comprising a pickup mode selecting means for carrying out selection of said pickup mode for using at least one of said pair of front camera portions and said rear camera portion in accordance with a disposed condition of said display portion.

17. A foldable portable telephone set as claimed in claim 15, further comprising a selecting means for selecting any one camera portion among said pair of front camera portions and said rear camera portion according to speech destination information.

* * * * *